L. W. CHUBB.
MEANS FOR ELIMINATING DISTORTED HARMONICS FROM ALTERNATING CURRENT GENERATORS.
APPLICATION FILED FEB. 13, 1917.

1,376,400.

Patented May 3, 1921.

WITNESSES
William Siber
Geo. W. Hansen.

INVENTOR
Lewis W. Chubb.
BY
ATTORNEY

UNITED STATES PATENT OFFICE.

LEWIS W. CHUBB, OF EDGEWOOD PARK, PENNSYLVANIA, ASSIGNOR TO WESTING-HOUSE ELECTRIC & MANUFACTURING COMPANY, A CORPORATION OF PENNSYLVANIA.

MEANS FOR ELIMINATING DISTORTED HARMONICS FROM ALTERNATING-CURRENT GENERATORS.

1,376,400.  Specification of Letters Patent.  Patented May 3, 1921.

Application filed February 13, 1917. Serial No. 148,426.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Means for Eliminating Distorted Harmonics from Alternating-Current Generators, of which the following is a specification.

My invention relates to dynamo-electric machines and particularly to means whereby selected harmonic impulses that obtain in the voltage waves developed in the armature circuits thereof may be substantially minimized or entirely eliminated.

In commercial alternating-current dynamo-electric machines, it is usually desirable to insure the production of voltage waves that conform substantially to sine waveforms. This is desirable because the harmonic impulses in the voltage waves impressed upon a distributing system may often interfere with the satisfactry operation of an adjacent circuit, such as a telephone or a telegraph circuit. Harmonic voltage impulses of this character may also be of sufficient magnitude to establish dangerous potential differences in parts of the system and to seriously increase the losses in alternating-current apparatus connected across the distributing means of the system by reason of the circulation therethrough of the harmonic currents resulting from these harmonic voltage impulses.

One object of my invention is to provide means for suppressing selected harmonic impulses in the voltage waves developed in the armature circuit of a dynamo-electric machine that are a result of the varying magnetic reluctance of the several air gaps embodied in the machine. I accomplish this by minimizing and suppressing those pulsations of the main field flux which are the direct cause of the development of these disturbing harmonics in the fundamental voltage waves.

Figure 1:
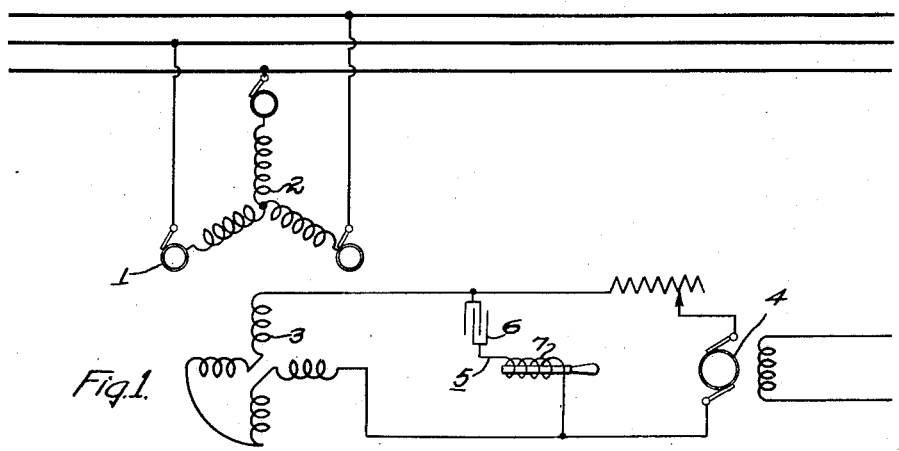
Figure 2:
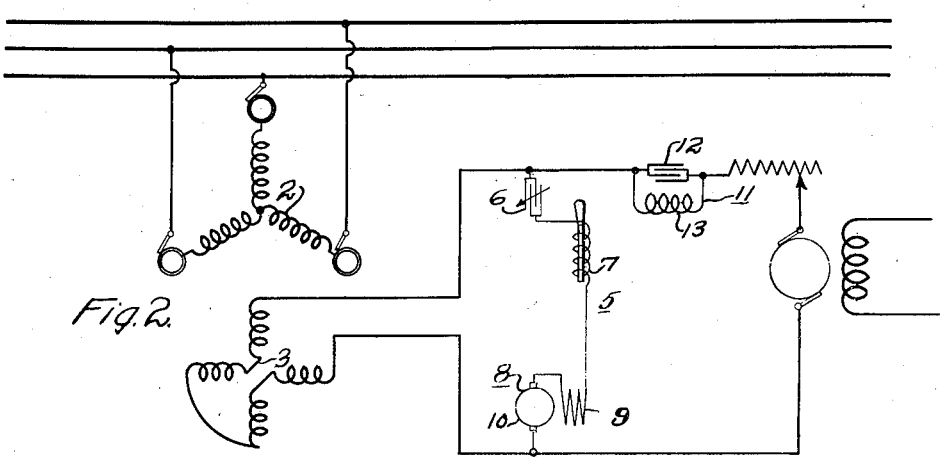
Figure 3:
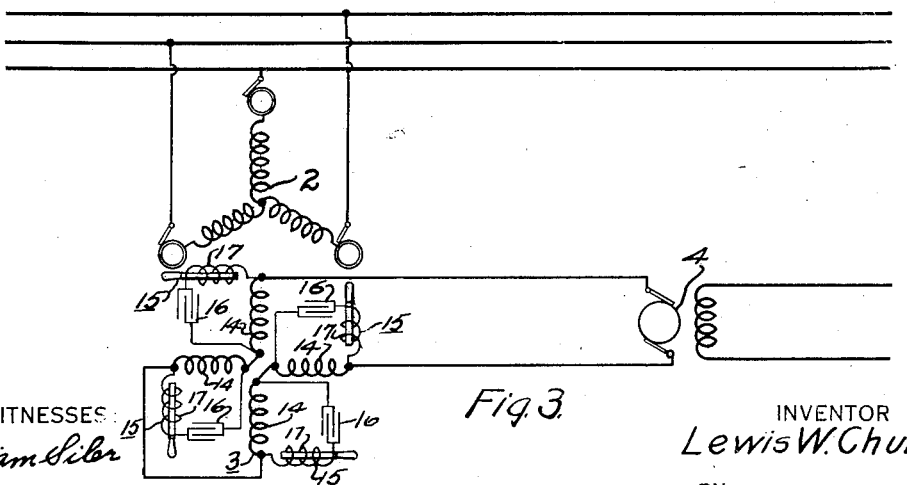

For a better understanding of the nature and scope of my invention, reference may be had to the following description and the accompanying drawing in which Figure 1 is a diagrammatic view of an alternating-current dynamo-electric machine embodying a form of my invention, and Figs. 2 and 3 are diagrammatic views of dynamo-electric machines embodying modified forms of the invention as shown in Fig. 1.

In a dynamo-electric machine having salient field poles, it is well known that flux pulsations may be set up in the main-field flux of the machine, particularly when the machine is devoid of pole dampers, or an amortisseur winding, by reason of the differences in the magnetic reluctance of the several air-gaps embodied in the machine. It follows, therefore, that if these flux pulsations obtain, harmonic impulses will be superposed upon the main-voltage waves generated by the dynamo-electric machine, thereby distorting the voltage wave forms. As a consequence of these flux pulsations, alternating currents are generated in the field winding of the dynamo-electric machine which develop magnetizing forces that oppose these flux pulsations. These induced currents react to suppress, in a degree, the flux pulsations.

My invention, therefore, consists in providing a low-impedance path for these currents generated in the field winding whereby they may react to more fully neutralize these flux pulsations than otherwise would result. I also provide means to compensate for at least the resistance-drop obtaining in the field winding in order that the distorting voltage impulses mentioned above may be substantially eliminated. In some cases, the original flux pulsations may be completely reduced to zero and be overcome by other flux pulsations that pulsate opposite in direction to the original pulsations.

Referring to Fig. 1, a dynamo-electric machine 1, having an armature winding 2 and a field winding 3, is associated with an exciter 4 that is employed to supply exciting current to the field winding 3. For the purpose of illustration, it may be assumed that the field winding 3 is wound on salient pole pieces and that the reluctance of the several magnetic circuits embodied in the machine 1 differ from one another. The variations in the reluctance of the magnetic circuits may be occasioned by reason of variations in the air-gaps, such as may result from the armature slots formed in one member of the machine. As a result of the varying reluctance of the different magnetic circuits, pulsations of the flux are superposed upon the main-field flux, thereby generating alternating currents in the field winding 3 of the machine. The alternating currents thus induced in the field winding 3 generate magnetizing forces that oppose, to a certain degree, these flux pulsations in the main field flux. If the resistance of the field circuit and that of the armature circuit of the exciter 4 were zero, the alternating currents induced in the field winding 3 would completely neutralize these flux pulsations, assuming, of course, that perfect mutual inductance exists between the field winding 3 and the armature winding 2.

Since the resistance of the aforementioned circuits is not zero, these flux pulsations are not completely neutralized and they react upon the armature winding 2 of the machine in such a manner as to induce therein harmonic voltage impulses that may seriously distort the main voltage waves developed therein. In order to substantially minimize these flux pulsations, the frequency of which may be readily determined in any suitable manner, I connect a circuit 5, comprising a condensive element 6 and an inductive element, 7, in shunt to the field winding 3. The electrical constants of the elements 6 and 7 are so adjusted that the field winding 3, in combination with the shunt circuit 5, constitutes a series resonant circuit that is tuned to the frequency of the alternating currents induced in the field winding 3. In consequence thereof, these induced currents are enhanced in value, and the magnetizing forces resulting therefrom are effective in substantially minimizing the flux pulsations in the main field. The circuit established through the field winding 3 and the shunt circuit 5 is thus made non-reactive to the flow of an alternating current of the proper frequency only. At the same time, this alternating current induced in the winding 3 possesses a slight tendency only to flow through the armature circuit of the exciter 4.

While the shunt circuit 5 permits the induced current in the field winding 2 to substantially minimize the flux pulsations, they are not entirely eliminated because of the resistance drop in the local circuit comprising the field winding 3 and the circuit 5. In Fig. 2, I have inserted, in series with the elements 6 and 7, an alternating-current booster generator 8 having a series field winding 9, a shunt direct-current excited field winding 9$^a$ and an armature 10. The booster 8 is, of course, propelled by an auxiliary source of power (not shown). A parallel resonant circuit 11, comprising a condenser element 12 connected in shunt to an inductive element 13, is connected in series circuit with the armature winding of the exciter 4. The elements 12 and 13 are so adjusted as to preclude the flow, through the armature circuit of the exciter 4, of alternating currents having the frequency to which the field winding 3 and shunt circuit 5 are tuned.

The field windings of the booster 8 are so adjusted that the voltage generated by the booster may always be sufficient to overcome, at least, the resistance-drop in the local circuit comprising the field winding 3 and the shunt circuit 5. In other words, the resistance-drop and the imperfect magnetic coupling between the field winding 3 and the armature winding 2 may be completely compensated for and, therefore, the alternating currents induced in the field winding 3, by reason of the flux pulsations in the main field flux, may completely neutralize these flux pulsations. As a consequence, the flux pulsations will be completely dampened out, and the local circuit comprising the winding 3 and the shunt circuit 5 will be the equivalent of a circuit offering zero impedance to an alternating current of a certain frequency; namely, that induced in the field winding 3.

Of course, it is conceivable that the excitation of the booster 8 may be further increased and the voltage generated thereby may be shifted in phase by adjusting the relative excitations of the two field windings 9 and 9$^a$. In consequence thereof, harmonic impulses may be generated in the armature winding 2 which are opposite in direction to the original harmonic impulses induced therein by the aforementioned field pulsations.

In a dynamo-electric machine having salient poles, it frequently happens that flux pulsations may be generated by reason of the sagging of the rotor or stator or the wear or disalinement of the rotor bearings. Flux pulsations thus occasioned are not always capable of being eliminated or minimized as indicated above. In this particular instance, the field winding may be sub-divided, as shown in Fig. 3, into a plurality of sections 14 which are connected in series with one another. Each section is provided with a shunt circuit 15 comprising a condensive element 16 and an inductive element 17. The elements 16 and 17 are adjustable in order that series resonance may be established in each local circuit comprising a field section 14 and its associated shunt circuit 15 for an alternating current of a predetermined frequency. By sub-dividing the field winding of the alternator and supplying elements for establishing series resonant circuits through the field-winding sections, as indicated, flux pulsations that are difficult to eliminate otherwise may be substantially minimized.

It will be understood that I do not limit my invention to the particular combinations described since many modifications may be made therein without departing from the spirit and scope of the appended claims.

I claim as my invention:

1. The combination with a dynamo-electric machine and a field winding therefor, of means for substantially neutralizing the resistance of said winding to alternating currents which are induced therein by reason of the varying reluctance of the magnetic circuits embodied in said machine.

2. The combination with a dynamo-electric machine and a field winding therefor, of means for establishing series resonance in said field winding to an alternating current of a selected frequency, and additional means for compensating for at least the resistance-drop in said field winding by reason of the flow therethrough of said alternating current.

3. The combination with a dynamo-electric machine and a field winding therefor, of means for establishing series resonance in said field winding to an alternating current of a selected frequency, and an auxiliary source of alternating-current electromotive force connected in circuit with said field winding in order to compensate for the ohmic resistance offered by said field winding to the flow therethrough of said alternating current.

4. The combination with a dynamo-electric machine and a field winding therefor, of means for establishing series resonance in said winding to an alternating current of a selected frequency, and a source of alternating-current electromotive force connected in circuit with said field winding in order to enhance the flow of said alternating current in the said field winding.

5. The combination with an alternating-current dynamo-electric machine and a field winding therefor, of means for supplying an alternating exciting current to said field winding that will damp out, from the armature circuit of said dynamo-electric machine, harmonics of any predetermined frequency that may be caused by the varying reluctance of the magnetic circuits embodied in the machine.

6. The combination with a dynamo-electric machine comprising a field winding, and a source of direct-current excitation therefor, of means for establishing series resonance in said winding to an alternating current of a selected frequency, an auxiliary source of electromotive force connected in circuit with said field winding, and means whereby current of said selected frequency may be supplied to said winding from said auxiliary source.

7. The combination with a dynamo-electric machine comprising a field winding, and a source of direct-current excitation therefor, of means for establishing series resonance in said winding to an alternating current of a selected frequency, a booster machine connected in circuit with said field winding, and means comprising a series field winding for said booster whereby current of said selected frequency may be supplied to said winding from said booster machine.

8. The combination with a dynamo-electric machine comprising a field winding, and a source of direct-current excitation therefor, of means for establishing series resonance in said winding to an alternating current of a selected frequency, and a booster machine connected in circuit with said field winding to supply currents of said frequency thereto.

9. The combination with a dynamo-electric machine comprising a field winding, and a source of direct-current excitation therefor, of means for establishing series resonance in said winding to an alternating current of a selected frequency, means connected in circuit with said field winding to enhance the currents of said selected frequency, and means between said enhancing means and said exciting-current source to prevent excess currents of the selected frequency from flowing through said source.

In testimony whereof, I have hereunto subscribed my name this 29th day of January, 1917.

LEWIS W. CHUBB.